US007165663B2

(12) United States Patent
Donner

(10) Patent No.: US 7,165,663 B2
(45) Date of Patent: Jan. 23, 2007

(54) POWER SCREWDRIVER WITH LOW-NOISE TORQUE CLUTCH

(75) Inventor: Hans-Christian Donner, Olching (DE)

(73) Assignee: Hilti Aktiengesellschaft, Schaan (LI)

( * ) Notice: Subject to any disclaimer, the term of this patent is extended or adjusted under 35 U.S.C. 154(b) by 109 days.

(21) Appl. No.: 11/015,136

(22) Filed: Dec. 16, 2004

(65) Prior Publication Data

US 2005/0150735 A1 Jul. 14, 2005

(30) Foreign Application Priority Data

Dec. 20, 2003 (DE) ................................ 103 60 282

(51) Int. Cl.
*B25B 23/157* (2006.01)
*F16D 47/00* (2006.01)

(52) U.S. Cl. ........................ 192/48.6; 173/178; 81/475

(58) Field of Classification Search ............... 192/48.6, 192/56.1; 173/178; 81/475

See application file for complete search history.

(56) References Cited

U.S. PATENT DOCUMENTS

| | | | | |
|---|---|---|---|---|
| 1,881,728 | A * | 10/1932 | Levedahl | 173/13 |
| 2,884,103 | A * | 4/1959 | Connell | 192/56.53 |
| 4,630,512 | A * | 12/1986 | Durr | 81/475 |
| 4,655,103 | A * | 4/1987 | Schreiber et al. | 81/474 |
| 4,947,714 | A * | 8/1990 | Fluri | 81/475 |
| 5,138,916 | A * | 8/1992 | Sato et al. | 81/474 |
| 5,538,089 | A * | 7/1996 | Sanford | 173/2 |
| 6,109,149 | A * | 8/2000 | Neumaier | 81/469 |
| 6,739,225 | B1 * | 5/2004 | Bader et al. | 81/475 |
| 2005/0126802 | A1 * | 6/2005 | Ludwig et al. | 173/178 |

FOREIGN PATENT DOCUMENTS

| | | | |
|---|---|---|---|
| CA | 2283213 | | 3/2000 |
| DE | 102004011068 | B3 * | 6/2005 |

* cited by examiner

*Primary Examiner*—Richard M. Lorence
(74) *Attorney, Agent, or Firm*—Abelman, Frayne & Schwab

(57) ABSTRACT

A power screwdriver (1) with a rotationally driven, axially displaceable mounted tool spindle (2) with a low-noise torque clutch (3) which comprises a ratchet-spring biased ratchet coupling (6) driven by a driven ratchet part (12) and a rigid slack clutch spring (7) biased claw coupling (8). The ratchet coupling (6) and the claw coupling (8) are combined using a common, axially displaceable, freely rotatable coupling sleeve (9). The ratchet coupling (6) has opposing oriented, peripheral inclined beveled cams (10) and the claw coupling (8) has opposing oriented catches (11). The driven ratchet part (12) and the coupling sleeve (9) are arranged freely rotatably on an intermediate sleeve (13), which is mounted freely rotatable and axially displaceable on the tool spindle (2). The ratchet spring (5) is arranged between the intermediate sleeve (13) and the coupling sleeve (9) and the clutch spring (7) is arranged between the intermediate sleeve (13) and the tool spindle (2).

5 Claims, 1 Drawing Sheet

POWER SCREWDRIVER WITH LOW-NOISE TORQUE CLUTCH

BACKGROUND OF THE INVENTION

Figure 1:
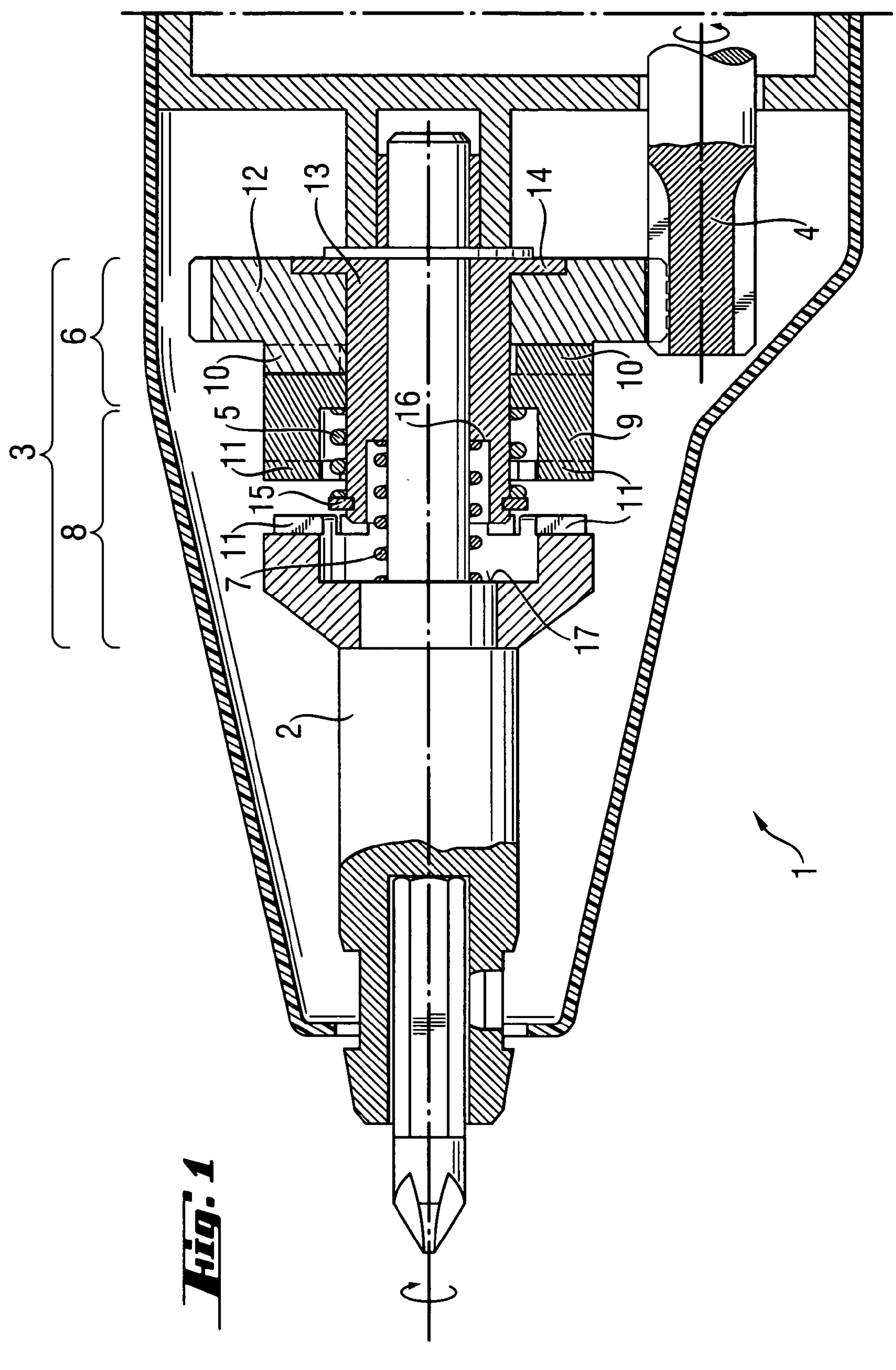

The invention relates to a power screwdriver having a low-noise torque clutch.

In power screwdrivers for driving screws, upon attaining a pre-defined torque the spring force flow from the drive motor to the screw tool is interrupted to avoid excessive driving of the screw. Conventionally, ratchet couplings with two ratchet parts that are spring biased relative to each other are used as torque clutches and each have peripherally inclined beveled cams. The drawback in this type of simple ratchet coupling is the annoying, loud "chattering", which also results in increased wear of the ratchet coupling.

U.S. Pat. No. 4,655,103 discloses a power screwdriver with a low noise torque clutch, wherein the ratchet coupling is combined with a claw coupling using a common coupling sleeve, wherein a ratchet spring is arranged between the driven ratchet part and the coupling sleeve.

According to U.S. Pat. No. 6,109,149, a power screwdriver has a low-noise torque clutch, which comprises a ratchet coupling and a claw coupling that are combined using a common, axially displaceable, freely rotational coupling sleeve, wherein the ratchet coupling has oppositely oriented peripherally inclined beveled cams and the claw coupling has oppositely oriented, peripheral linear catches. A rigid ratchet spring is arranged between the freely rotational driven ratchet part on the tool shaft and a slack clutch spring is arranged between the driving coupling part connected to the tool shaft and the coupling sleeve. By means of this axial serial arrangement, a high contact pressure of the power screwdriver against the work piece to overcome the rigid ratchet spring is required to engage the ratchet coupling by the axial displacement of the tool shaft and to activate the torque transmission. In addition, this high contact force results in a high quantity of friction heat in the springs rubbing against each other in the override operation.

SUMMARY OF THE INVENTION

The object of the invention is to provide a power screwdriver with a low-noise torque coupling, which requires a low contact force for activating torque transmission. A further object of the invention is to reduce the quantity of frictional heat in the override operation.

This object is achieved in accordance with the invention by a power screwdriver with a rotationally driven, axially displaceable mounted tool spindle having a low-noise torque clutch. The clutch comprises a combination of a driven ratchet coupling biased by a rigid ratchet spring with a driving claw coupling that is biased using a stack clutch spring, which are combined using a common, axially displaceable, freely rotating coupling sleeve. The ratchet coupling has opposing oriented peripheral inclined beveled cams and the claw coupling has opposing oriented peripheral linear catches. The driven ratchet part and the coupling sleeve are arranged freely rotational on an intermediate sleeve, which is mounted on the tool spindle to be freely rotational and axially displaceable. The ratchet spring is arranged between the intermediate sleeve and the coupling sleeve and the clutch spring is arranged between the intermediate sleeve and the tool spindle.

By virtue of the intermediate sleeve being fixed to the driven ratchet part, the rigid ratchet spring is uncoupled relative to a displacement of the tool spindle. Consequently, upon application of the power screwdriver against the work piece it is not its high spring force that must be overcome but the weak spring force of the slack clutch spring. The quantity of frictional heat of the springs rubbing in override operation is correspondingly lower.

The intermediate sleeve advantageously has a radial outer flange on the drive side, whereby a flush stop in the direction of the driven ratchet part relative to a drive-side displacement of the intermediate sleeve can be realized relatively simply.

Advantageously, a locking ring is affixed on the drive-side to the intermediate sleeve, whereby an easily assembled drive-side stop for the ratchet spring is provided.

Advantageously, the intermediate sleeve has a front open, coaxial inner step on the driving side, whereby a flush, driving-side stop for the clutch spring can be realized in a technologically simple fashion.

Advantageously, the tool spindle in the axial zone of the claw coupling forms a driving-side radial shoulder, whereby a positive, driving-side stop for the clutch spring can be realized in a technologically simple fashion.

The function of the low-noise torque clutch corresponds to the clutch described in detail in DE 19844064, in that after exceeding a pre-defined torque for the first-time the ratchet coupling uncouples against the spring force of the rigid ratchet spring and consequently the coupling sleeve and the tool spindle is displaced on the driving side. With the next clutch intervals, the ratchet coupling closes by virtue of the spring force of the rigid ratchet spring and together with the ratchet spring, the coupling sleeve is displaced on the driven side by virtue of the spring force of the slack clutch spring and thus uncouples in the override operation.

BRIEF DESCRIPTION OF THE INVENTION

The invention is described more completely with reference to the drawings, wherein:

FIG. 1 shows a power screwdriver in longitudinal section, in accordance with the invention.

DETAILED DESCRIPTION OF THE INVENTION

In accordance with the invention, FIG. 1 shows a merely implied power screwdriver 1 with a rotationally driven, axially displaceable mounted tool spindle 2 having a low-noise torque coupling 3, as described more completely in DE 198 44 064. A motor cogwheel 4 driven ratchet coupling 6 that is biased with a rigid ratchet spring 5 is combined with a driving claw coupling 8 that is biased by a slack clutch spring 7. The ratchet coupling 6 is axially combined with the claw coupling using a common, axially displaceable, freely rotational coupling sleeve 9. The ratchet coupling 6 has opposing oriented peripheral inclined beveled cams 10 and the claw coupling 8 has opposing oriented peripheral linear catches 11. A ratchet part 12 driven by the motor cogwheel 4 and the coupling sleeve 9 are arranged freely rotatable on an intermediate sleeve 13, which is mounted freely rotatable and axially displaceable on the tool spindle 2. The ratchet spring 5 is arranged between the intermediate sleeve 13 and the clutch sleeve 9 and the coupling spring 7 is arranged between the intermediate sleeve 13 and the tool spindle 2. The intermediate sleeve 13 has a radial outer collar 14 on the driven side, which strikes flush on the driven ratchet part 12. A locking ring 15 is affixed to the intermediate sleeve 13 on the drive side, at which the rigid ratchet spring 5 strikes flush. The intermediate sleeve 13 has a frontally open, coaxial inner step 16, on the driving side, at which the slack clutch spring 7 strikes flush on the driven side. In the axial zone of the claw coupling 8, the tool spindle 2 forms a driving-side radial shoulder 17, at which the slack clutch spring 7 strikes flush on the driving side. In the illustrated override operation, which follows upon the opening of the ratchet coupling upon exceeding a pre-defined torque, the ratchet coupling 6, which is further rotated about a cam 10, is already re-closed by the spring force of the rigid ratchet spring 5. Using the ratchet coupling 6, the coupling sleeve 9 is also displaced on the drive side by the spring force of the slack clutch spring 7. The low noise torque clutch is thus uncoupled in the override operation.

What is claimed is:

1. A power screwdriver with a rotationally driven, axially displaceable mounted tool spindle (2) with a low-noise torque clutch (3), comprising a ratchet coupling (6) biased into engagement by a ratchet spring (5) and driven by a driven ratchet part (12) and a driven claw coupling (8) biased out of engagement by a slack clutch spring (7); the ratchet coupling (6) and the claw coupling (8) are combined using a common, axially displaceable, freely rotatable coupling sleeve (9), wherein the ratchet coupling (6) has opposing oriented, peripheral inclined beveled cams (10) and the claw coupling (8) has opposing oriented catches (11), wherein the driven ratchet part (12) and the coupling sleeve (9) are arranged freely rotatably on an intermediate sleeve (13) that is mounted freely rotatable and axially displaceable on the tool spindle (2), and wherein the ratchet spring (5) is arranged between the intermediate sleeve (13) and the coupling sleeve (9) and the clutch spring (7) is arranged between the intermediate sleeve (13) and the tool spindle (2).

2. The power screwdriver of claim 1, wherein the intermediate sleeve (13) has a radial outer collar (14) on a side thereof surrounded by the driven ratchet part (12).

3. The power screwdriver of claim 2, wherein a locking ring (15) is affixed on the intermediate sleeve (13) at an end thereof remote from the radial outer collar (14).

4. The power screwdriver of claim 2, wherein the intermediate sleeve (13) has a coaxial inner step (16) open at an end side thereof remote from the radial outer collar (14).

5. The power screwdriver of claim 1, wherein the tool spindle (2) forms a driving-side radial shoulder (17) in an axial zone of the claw coupling (8).

* * * * *